Feb. 6, 1968   R. B. EMERY ET AL   3,367,723
STEADY FLOW BIN FOR PULVERULENT MATERIAL
Filed April 7, 1966   2 Sheets-Sheet 1

INVENTORS.
ROBERT B. EMERY
RICHARD F. BAILEY
BY *Burns, Doane, Benedict, Swecker & Mathis*

ATTORNEYS.

INVENTORS.
ROBERT B. EMERY
RICHARD F. BAILEY

ATTORNEYS.

United States Patent Office 3,367,723
Patented Feb. 6, 1968

3,367,723
STEADY FLOW BIN FOR PULVERULENT MATERIAL
Robert B. Emery and Richard F. Bailey, Duncan, Okla., assignors to Halliburton Company, Duncan, Okla., a corporation of Delaware
Filed Apr. 7, 1966, Ser. No. 540,889
10 Claims. (Cl. 302—53)

ABSTRACT OF THE DISCLOSURE

A storage tank for pulverulent material. The tank has sloping walls with an upright pipe inside the tank for discharging the contents of the tank. An aerating surface is provided at the bottom of the tank adjacent the open end of the pipe. A side discharge pipe is also provided adjacent the bottom. The aerating surface is adapted for effectively fluidizing the material adjacent the tank bottom for discharge through either the side discharge pipe or the upright pipe.

---

This invention relates to storing and dispensing pulverulent materials and more particularly to apparatus for readily discharging pulverulent material from a tank.

When a bin is being filled with pulverulent material, large particles of material tend to roll down the mound which forms at the center of the bin. Consequently, the smaller particles tend to be concentrated in the center of the bin and the larger particles are collected near the walls of the bin. In order to avoid particle size segregation when the material is discharged through a central opening in the bottom of the bin, the sides of the bin slope toward the outlet opening. Thus, the larger particles are continually migrating into the stream of particles that flows out of the bottom of the bin.

In conventional sloping wall storage bins that rely on gravity to cause the pulverulent material to flow toward an outlet at the bottom of the bin, a portion of the material often remains in the bin. A condition known as rat-holing may occur in which the pulverulent material directly over the outlet flows out of the tank, but the material surrounding the outlet is compacted to such an extent that the grains of material are unable to move relative to each other. Consequently, a hole is formed down through the pulverulent material at the center of the tank directly over the outlet, and the major portion of the material remains in the tank.

Another condition known as insufficient clean out occurs when the pulverulent material cakes along the sides and corners of the tank. A third condition may also be present in which the pulverulent material forms a bridge across the outlet. The bridge is formed by the pressure of the material above the outlet. Each of these conditions results in incomplete discharge of the pulverulent material from the tank. In order to remove the remaining pulverulent material from the tank, it is necessary to manually dislodge the pulverulent material from the tank by means of vibrators or rods.

The gravity flow characteristics of bins and tanks may be improved by enlarging the opening at the bottom of the tank. The size of the outlet opening and the slope of the walls of the bin that are required to achieve substantially complete gravity discharge depend upon the grain size and frictional properties of the particulate material. The problems of arching, rat-holing and insufficient clean up result from the grains of particulate material becoming locked together by the weight of the material in the bin. In order to overcome this difficulty, it is necessary to design the tank in such a way that the gravity forces on the material exceed the structural strength of the mass of grains that are locked together. It has been found that one way of overcoming the structural strength of the compacted mass of material is to enlarge the opening at the bottom of the tank.

One disadvantage, however, of a large opening at the bottom of the bin or tank is that a large valve is required to control the flow through the opening. Another disadvantage of utilizing a large outlet opening for discharging pulverulent material from a bin is that the conditions under which the bin may be used are greatly restricted. Usually large openings are practical only when discharging from a tank or bin into a large hopper or onto a moving surface, such as a conveyor belt.

Accordingly, it is an object of this invention to provide an improved storage tank or bin for pulverulent material.

It is a further object of this invention to provide apparatus for avoiding incomplete discharge of the contents of bins having sloping walls.

It is a still further object of this invention to provide apparatus for overcoming the difficulties of gravity discharge from a tank, without the necessity of providing a large outlet opening or valve.

These objects are accomplished in accordance with a preferred embodiment of the invention by constructing a sloping wall tank of a shape and size necessary to insure optimum gravity flow toward the bottom outlet of a selected pulverulent material. At the bottom of the tank, an aerating surface is provided. An outlet pipe may either be suspended over the aerating surface for upward discharge of the pulverulent material, or a gravity flow outlet pipe may be provided at the side of the aerating surface. The outlet pipe through which the pulverulent material flows is preferably smaller than the diameter of the aerating surface. The width of the aerating surface is selected to achieve gravity flow of the pulverulent material along the sides of the tank and toward the bottom of the tank, without becoming compacted.

This preferred embodiment is illustrated in the accompanying drawings in which.

Figure 1:
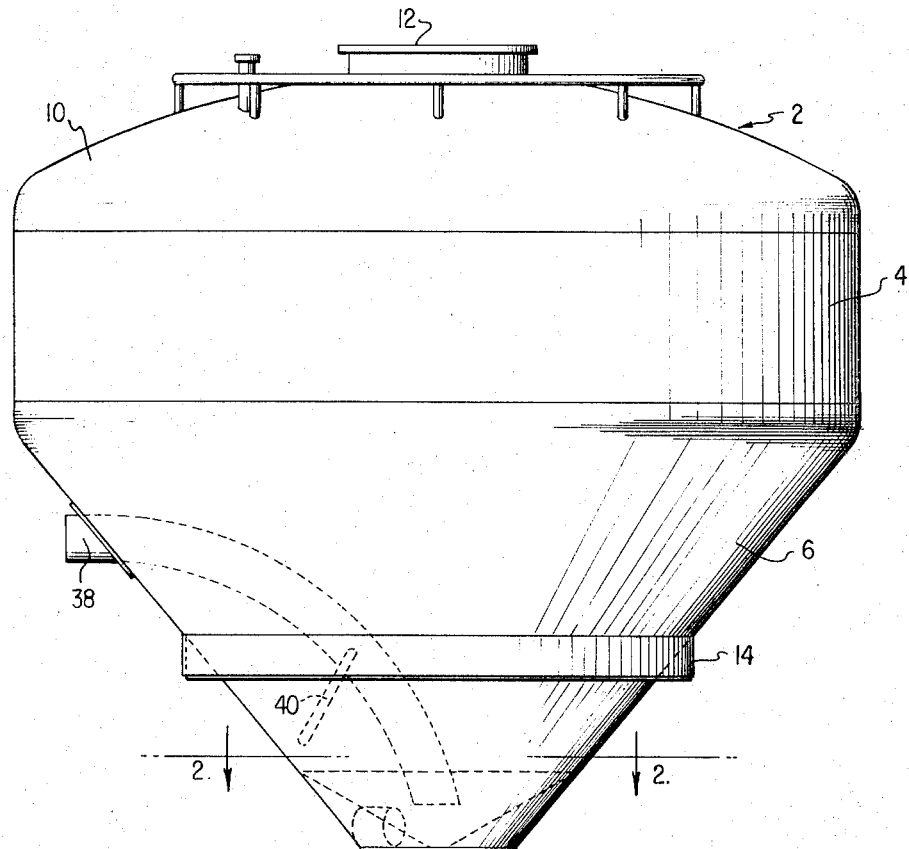
FIG. 1 is a side elevational view of a tank having the aerating device of this invention installed therein.
Figure 4:
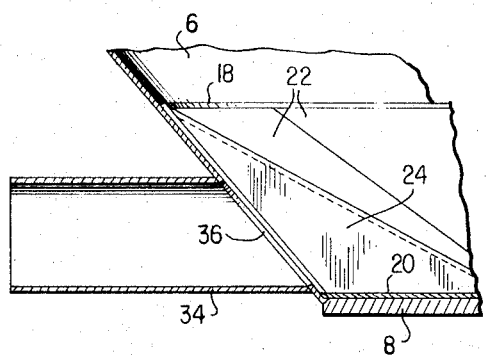
FIG. 4 is a detail cross sectional view of the tank along the line 4—4 in FIG. 2.

Referring to FIG. 1, a tank 2 has a cylindrical side wall 4 and a sloping side wall 6. The bottom of the tank is covered by a plate 8 and the top of the tank has a cover 10. A hatch 12 is provided in the top of the cover 10 for filling the tank with pulverulent material. When the hatch is closed, the tank 2 is sealed against the leakage of gas to permit the pressure inside the tank to be increased above atmospheric pressure.

The tank is designed to insure gravity flow of the particulate material in the tank toward the bottom 8 of the tank, without arching, rat-holing, or caking. The sides 6 have a relatively steep slope, for example 50°, and the bottom 8 of the tank has a relatively large diameter to prevent arching of the compacted material at the bottom of the tank. The tank 2 is intended to be installed on a vehicle chassis or other framework where it is supported in an upright position. In order to facilitate mounting of the tank on the chassis or frame, a collar 14 is rigidly secured to the side wall 6. The collar 14 may be rectangular with a central circular opening for receiving the side wall 6.

A pair of aerating devices 16 are mounted in the tank 2 at the lower end of the side wall 6. Each of the devices has a side 18 which is frusto-conical and conforms to the slope of the side wall 6 of the tank. The side 18 projects upwardly from a base 20 of each device. The base 20 is preferably semicircular and the side 18 is rigidly secured along the curved edge of the base 20. A plurality of wedge-shaped porous plates 22 extend radially outward from adjacent the center of the straight edge of the base 20 to the upper edge of the side 18 of each of the devices 16. The porous plates 22 are preferably formed of sintered bronze or other rigid, porous material, and are approximately flat. Each of the devices 16 has end walls 24 along the straight edges of the bases 20, to form an enclosure or chamber on the interior of each device 16. Air or other aerating gas may be supplied to the interior of each of the devices 16 through pipes 26 which are threadedly engaged in holes extending through the bottom plate 8 of the tank and the respective bases 20 of the devices 16.

The devices are rigidly secured to the bottom plate 8. A block 28 on the interior surface of each base 20 is rigidly clamped against the base 20 by a pair of bolts 30 which extend through the plate 8. The pipes 26 may be threaded into the hole in the center of each block 28, and the corresponding hole in the bottom plate 8 may be larger than the diameter of the pipe so as not to interfere with threading the pipe into the hole in the plate 28. The pipes 26 may, however, be threaded directly into the plate 8.

When the devices 16 are rigidly secured in the bottom of the tank 2, the opposing end walls 24 and the straight edges of each base 20 are spaced apart to form a slot 32 extending from one side of the tank to the other across the bottom.

As previously stated, the slope of the side wall 6 is preferably at a sufficiently great angle to cause pulverulent material which would normally be used in the tank to flow readily by gravity toward the bottom plate 8. In order to avoid bridging or incomplete discharge through an outlet at the bottom of the tank, it would be necessary to provide a relatively large outlet opening. In many installations, it is unfeasible to have a large opening at the bottom, and yet complete emptying of the tank by avoiding bridging or caking in the tank is essential. By inserting the aerating devices 16 in the bottom of the tank that is designed for gravity discharge, the requirement for a large outlet opening at the bottom of the tank may be avoided.

Figure 2:
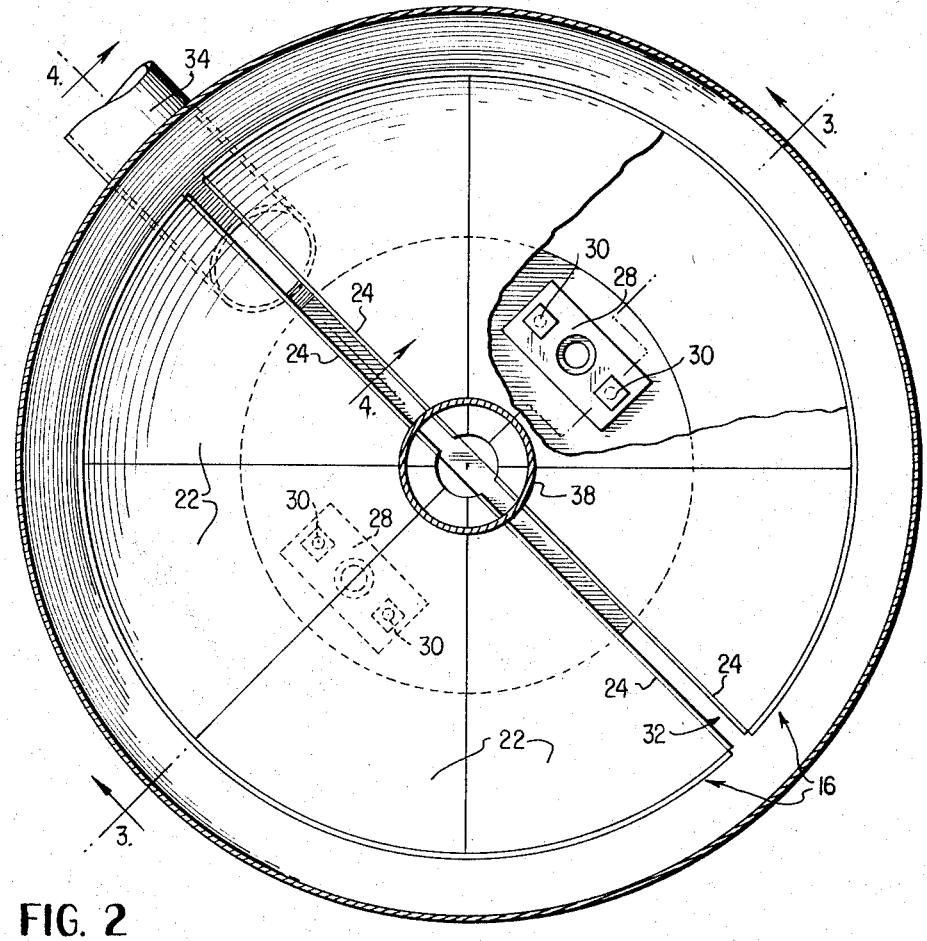
FIG. 2 is a cross sectional view of the tank along the line 2—2 in FIG. 1.
Figure 3:
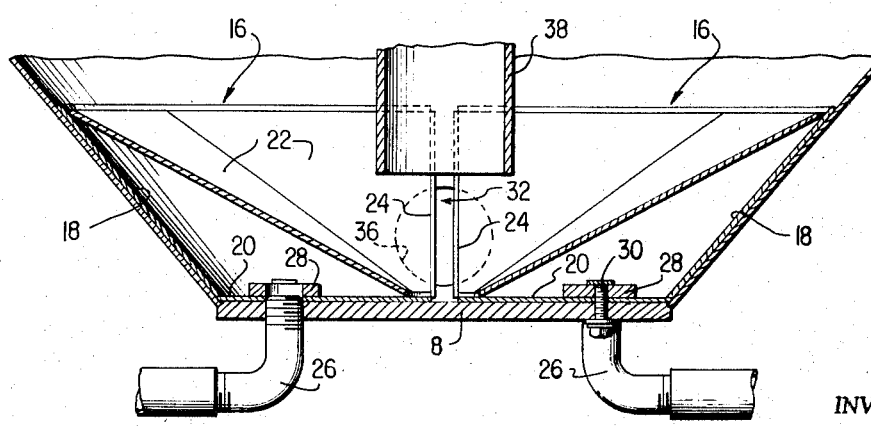
FIG. 3 is a cross sectional view of the tank along the line 3—3 in FIG. 2.

A discharge pipe 34 extends outwardly from the sloping wall 6 of the tank. The pipe 34 communicates with the interior of the tank through an opening 36 in the side wall 6 that is spaced slightly above the bottom plate 8. The opening 36, as shown in FIGS. 2 and 3, is aligned with the slot 32 between the aerating devices 16. An upper discharge pipe 38 extends through the wall 6 of the tank and is suspended by braces 40 in the tank. The lower end of the pipe 38 is positioned approximately over the center of the bottom plate 8 and below the top edge of the sides 18 of the aeration device, as shown in FIG. 3. Suitable valves, not shown, control flow through the discharge pipes 34 and 38, and air pipes 26.

In operation, assuming that the tank has been filled with pulverulent material of the character which would gravitate toward the lower plate 8 without caking, air is supplied through the pipes 26 to the enclosures in the aerating devices 16. The air flows upwardly through the porous plates 22, with sufficient velocity to aerate the pulverulent material directly above the porous plates. When the valve controlling the flow of material through the discharge pipe 34 is open and the control valve for the pipe 38 is closed, material in the tank is directed toward the center of the bottom plate 8 where it passes into the slot 32 between the devices 16. The material is drawn by the air currents through the slot 32 and into the outlet pipe 34 from which it may be conducted to the desired location. As the particulate material passes across the surface of the plates 22, additional material in the tank is displaced by gravity toward the aerating devices 16.

The material may be discharged upwardly through the pipe 38 by closing off the lower pipe 34 and opening the valve for the pipe 38. The rate of flow of air into the enclosures in the devices 16 is sufficient to fluidize the particles directly above the porous plates 22 and the draft of air entering the lower end of the pipe 38 is sufficient to draw the particulate material in a fluidized condition upwardly through the pipe. As the material is drawn into a pipe 38, additional material gravitates toward the bottom of the tank. When the material reaches the point where theoretically it should be discharged through an outlet in the bottom of the tank, the aerating devices 16 cause the material to become fluidized so that caking or bridging does not occur.

An important feature of this invention is that storage tanks for pulverulent material may be designed to take advantage of gravity flow principles for causing the particulate material to gravitate toward a bottom outlet, without requiring the relatively large opening in the bottom of the tank which would theoretically be necessary in order to avoid bridging, rat-holing and insufficient clean up of the tank or bin. By utilizing the aeration devices of this invention in cooperation with relatively small discharge pipes in the side wall of the tank, a more practical system is achieved.

The flow rates of material through the pipes may be at a much lower rate than would be possible with large bottom openings that the theoretical gravity flow principles require. Also, by utilizing the device of this invention, the pulverulent material may be conducted away from the bottom of the tank and deposited at a remote location, instead of being dropped directly into a hopper or container under the storage tank, as would be necessary if the tank had the large bottom opening required to achieve gravity flow. Another advantage of the apparatus of this invention is that the overall height of the tank is reduced because a large valve at the bottom of the tank, which would be necessary to control flow through a large bottom opening, is eliminated. Accordingly, the tank may be conveniently mounted on a vehicle chassis or other frame where the bottom of the tank is inaccessible.

While this invention has been illustrated and described in one embodiment, it is recognized that variations and changes may be made therein without departing from the invention as set forth in the claims.

We claim:
1. Apparatus for storing and dispensing pulverulent material comprising:
   a tank, said tank having a sloping side wall, said side wall extending around said tank and converging toward an opening formed thereby at the bottom of the tank,
   plate means extending across said opening,
   aerating means in the tank adjacent the bottom of the tank, said aerating means including a plurality of individual sections, each of said sections having a side, a base, and an aerating surface secured on said side and base, said aerating surfaces sloping downwardly from said side wall toward the center of said tank bottom,
   said side wall having an outlet opening therein, said outlet opening being positioned between said plate means and the intersection of said surfaces with said side wall,
   said aerating means including means forming a passage between adjacent ones of said sections, said passage communicating between the outlet opening and the center of the tank above the areating surfaces, whereby pulverulent material is discharged from said tank effectively through the outlet opening.

2. Apparatus for storing and dispensing pulverulent material according to claim 1 wherein:
   said side wall slopes continuously and uniformly upward from said aerating means, whereby said material flows by gravity along said side wall toward said aerating means.

3. Apparatus for storing and dispensing pulverulent material according to claim 1 including:
an upright discharge pipe having one end suspended in the tank over the center of said aerating surfaces.

4. Apparatus for storing and dispensing pulverulent material according to claim 1 wherein:
said side wall is substantially frusto-conical,
said aerating surfaces being formed by porous substantially rigid sheet material.

5. Apparatus for storing and dispensing pulverulent material according to claim 4 wherein:
said aerating means includes means supporting said aerating surfaces independently of said tank side wall, said supporting means having a fluid receiving chamber therein communicating with said aerating surfaces, whereby air may be directed from said chamber through said surfaces for fluidizing material above said surfaces.

6. Apparatus for storing and dispensing pulverulent material according to claim 4 wherein:
said sections each include opposite end walls, and said side, end walls, base and aerating surface of the respective sections form individual aerating devices.

7. Apparatus for storing and dispensing pulverulent material according to claim 6 wherein:
said aerating devices are spaced apart, said passage means being defined by opposed end walls of said devices, said passage means being aligned with said outlet opening.

8. Apparatus for storing and dispensing pulverulent material according to claim 6 wherein:
said base of each device being semi-circular and being secured to said plate means, said side of each device being frusto-conical and conforming to the shape of said side wall, said side being secured along the periphery of said base.

9. Apparatus for storing and dispensing pulverulent material according to claim 8 wherein:
said aerating surface of each aerating device being secured at the top of said side and extending in downwardly sloping relation to approximately the center of the straight side of said base, said aerating device including upright end walls secured along said straight side of said base, said end walls being secured to said aerating surface.

10. Apparatus for storing and dispensing pulverulent material according to claim 9 wherein:
said end walls of one device being substantially parallel to the end walls of the other device and being spaced apart from the end walls of the other device whereby a slot is formed therebetween, said slot being aligned with said outlet opening.

References Cited

UNITED STATES PATENTS

| | | | |
|---|---|---|---|
| 2,915,341 | 12/1959 | Friedman | 302—53 |
| 3,053,420 | 9/1962 | De Saint-Martin | 222—195 |
| 3,236,422 | 2/1966 | Bailey et al. | 222—195 |
| 3,251,583 | 5/1966 | Mason et al. | 222—195 |

ROBERT B. REEVES, *Primary Examiner.*

K. N. LEIMER, *Assistant Examiner.*